United States Patent [19]

Cook

[11] Patent Number: 5,375,916
[45] Date of Patent: Dec. 27, 1994

[54] TRUCK AIR BRAKE LOCKING DEVICE

[76] Inventor: Bradley W. Cook, 9661 E. Navajo #2, Prescott Valley, Ariz. 86314

[21] Appl. No.: 140,497
[22] Filed: Oct. 25, 1993
[51] Int. Cl.$^5$ ...................... B60R 25/08; F16K 35/10
[52] U.S. Cl. ........................................ 303/89; 70/177; 70/178; 70/232; 70/DIG. 58; 70/163; 70/168
[58] Field of Search .................. 303/89; 188/265, 353; 70/175, 176, 177, 178, 179, 180, 232, DIG. 58, 53, 26, 39, 163, 168

[56] References Cited

U.S. PATENT DOCUMENTS

| | | | |
|---|---|---|---|
| 1,380,675 | 6/1921 | Myers | 70/178 |
| 1,530,814 | 3/1925 | Credle | 70/178 |
| 3,362,426 | 1/1968 | Polit et al. | 137/384.2 |
| 3,682,195 | 8/1972 | Cvetkovich | 137/384.6 |
| 3,998,495 | 12/1976 | Maxwell et al. | 303/89 |
| 4,454,934 | 6/1984 | Deveney et al. | 188/171 |
| 4,519,653 | 5/1985 | Smith | 303/89 |
| 4,543,984 | 10/1985 | Murray | 303/89 X |
| 4,543,984 | 10/1985 | Murray | 137/385 |
| 4,621,874 | 11/1986 | Gustafsson | 303/89 |
| 4,633,686 | 1/1987 | Carr | 70/179 |
| 4,662,196 | 5/1987 | Michon | 70/177 |
| 5,145,240 | 9/1992 | Harless et al. | 303/89 |

FOREIGN PATENT DOCUMENTS 0103752  5/1988  Japan .

OTHER PUBLICATIONS

"Encyclopedia of Polymer Science and Engineering", 2nd Ed., Mark et al.; John Wiley and Sons, N.Y. 1987: vol. 8, p. 60–66.

Primary Examiner—Robert J. Oberleitner
Assistant Examiner—Peter M. Poon
Attorney, Agent, or Firm—Richard C. Litman

[57] ABSTRACT

An anti-theft device for protecting air brake control valves from being manipulated is disclosed. A clamp assembly locks on to the valve knobs employed to release the air brakes in a vehicle. A pair of blocks incorporate a key lock assembly and posts to enable portable use of the device. This device is readily adaptable to lock more than one type of several standard brake valve knob sizes by utilizing removable inserts. Impact-resistant plastic or metallic compositions may form the bodies.

10 Claims, 3 Drawing Sheets

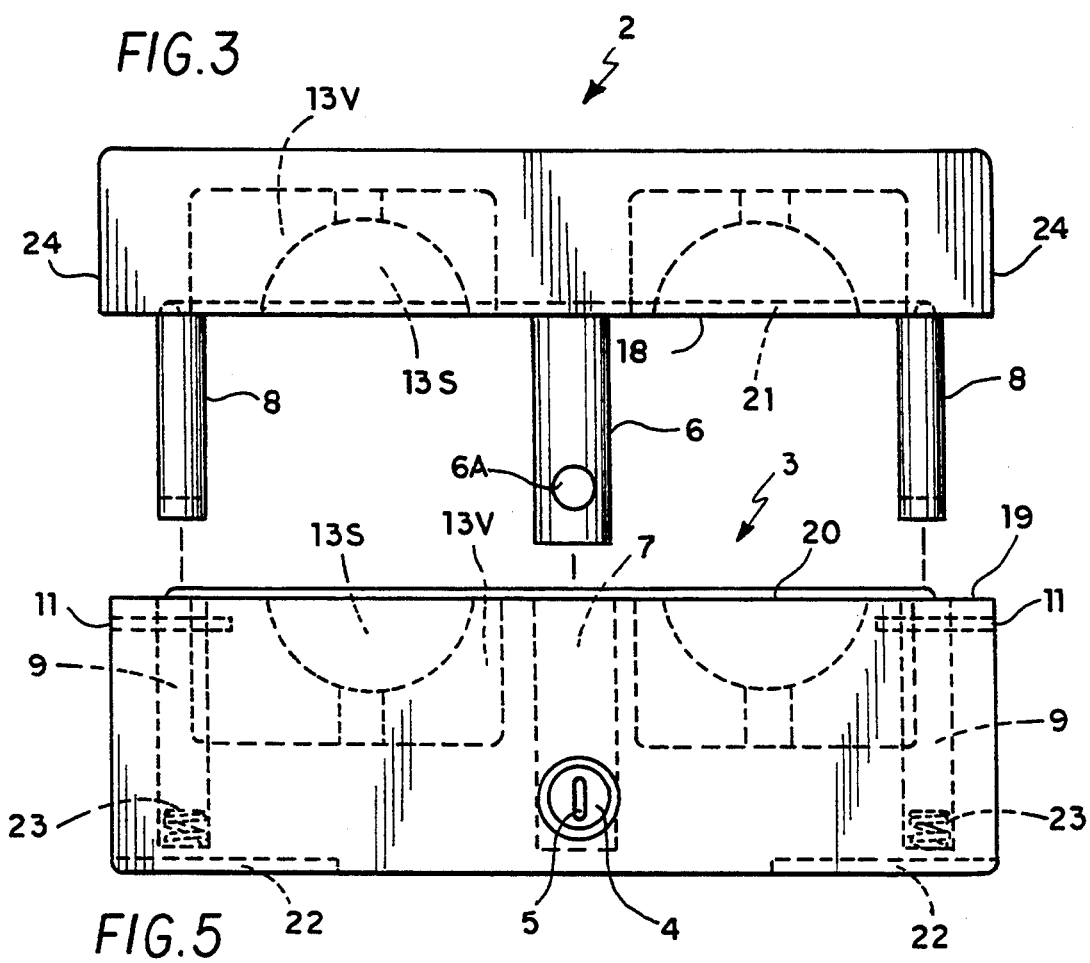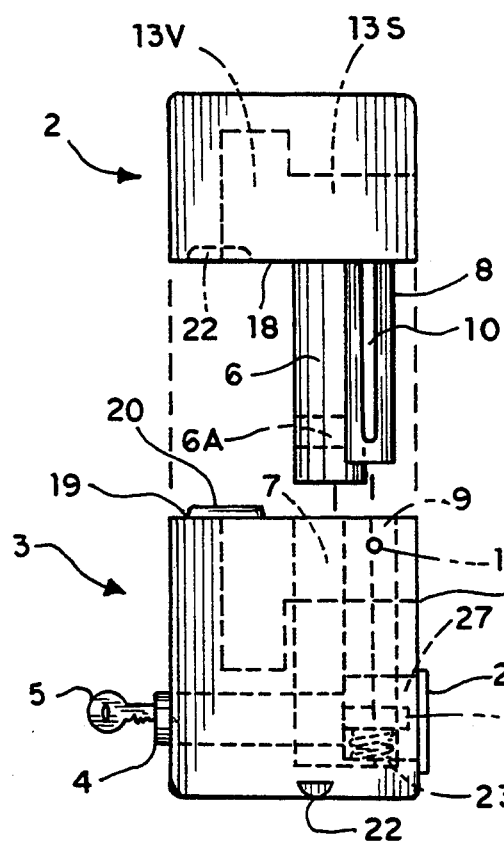

TRUCK AIR BRAKE LOCKING DEVICE

BACKGROUND OF THE INVENTION

1. Field of the Invention

The present invention relates to an anti-theft device for protecting the driver controlled valves serving the air brakes of a vehicle from being manipulated. A clamp assembly is locked on to the valve knobs controlling the air brakes and may be removed only by a key or the like.

2. Description of the Prior Art

U.S. Pat. No. 3,362,426 issued to Charles R. Polit et al. on Jan. 9, 1968 discloses an anti-theft lock valve device which requires a permanently installed housing integrated with said lock valve for either a fuel or braking system. The housing consists of U-shaped sections of sheet metal which must be assembled about the lock valve before said valve is installed in the brake system piping.

U.S. Pat. No. 3,682,195 issued to Degan O. Cvetkovich on Aug. 8, 1972 discloses a wheel lock positioned on the dashboard and interposed in the brake fluid line to at least one wheel brake cylinder of the vehicle.

U.S. Pat. No. 3,998,495 issued to John P. Maxwell et al. on Dec. 21, 1976 discloses a locking dashboard control valve for selectively establishing connections between the spring applied parking brake in an air braked vehicle and either the parking brake air reservoir or the exhaust port of the control valve, and incorporating a lock which enables the operator to secure the control valve in the position in which the parking brakes are applied.

U.S. Pat. No. 4,454,934 issued to Joseph E. Deveney et al. on Jun. 19, 1984 discloses a remotely controlled lock on a rotatable valve stem for use in a nuclear processing plant.

U.S. Pat. No. 4,519,653 issued to Paul B. Smith on May 28, 1985 discloses an additional parking brake control knob on the dashboard which operates the ignition system to permit the release of the parking brakes.

U.S. Pat. No. 4,543,984 issued to John M. Murray on Oct. 1, 1985 discloses a permanently installed lock box enclosing the valve for maintaining brake-on air pressure and mounted on the truck trailer.

U.S. Pat. No. 4,621,874 issued to Jan Gustafsson on Nov. 11, 1986 discloses a three-way valve as an anti-theft device for the deceleration brakes and parking brake controlled by a code lock.

U.S. Pat. No. 4,633,686 issued to Wesley G. Carr on Jan. 6, 1987 discloses an anti-theft brake lock which is key operated and integrated with the hydraulic fluid system.

U.S. Pat. No. 5,145,240 issued to Ronald L. Harless et al. discloses an air brake safety and anti-theft valve assembly which is permanently installed on the trailer and includes valve means for selectively venting the air supply line to the atmosphere in order to prevent the release of the air brakes.

Japanese Patent No. 63-103752 issued to Satoshi Arimitsu on May 9, 1988 discloses a brake valve device which maintains brake cylinder pressure by control from a switch.

None of the above inventions and patents, taken either singly or in combination, is seen to describe the instant invention as claimed. The patents fail to disclose a guard device comprising a clamp which is portable and blocks access to the air brake control knobs in the cabin of the tractor-trailer vehicle. Further, the prior art fails to disclose the novel feature of utilizing inserts in the guard device which enable adaptability to other standard valve knob systems.

SUMMARY OF THE INVENTION

The present invention is directed to a clamp assembly that locks on to the valve knobs controlling the release of the air brakes of a tractor-trailer combination rendering control of the air brakes inoperable. Therefore, the brakes of both vehicles remain locked to prevent movement or theft of the tractor-trailer.

The guard device comprises two half-bodies which are connected by a central locking post and at least two side posts, wherein the bodies are placed on the valve knobs, clamped together and locked by means of a lock assembly. The device further includes inserts which enable the device adaptable for locking at least two standard valve knob configurations.

Accordingly, it is a principal object of the invention to provide a lock device that cannot easily be tampered with and still be portable in that the device can be readily removed by a key.

It is an object of the invention to provide a lock device adaptable to isolate differently sized standard valve knobs by including inserts or adapters.

Another object of the invention is to provide a lock device having storage means for the inserts when unnecessary.

Still another object of the invention is to incorporate tongue and groove guard means in the abutting surfaces of the blocks forming the clamp assembly.

A further object of the invention is to mold the lock cylinder and upper portions of the posts in impact resistant plastic blocks, but include the alternative of utilizing metal blocks with an inserted lock cylinder protected in the rear by a guard plate. These and other objects of the present invention will become readily apparent upon further review of the following specification and drawings.

BRIEF DESCRIPTION OF THE DRAWINGS

FIG. 3 is a front elevational view of the upper block with inserts.

FIG. 4 is a side elevational view of the upper block without inserts.

FIG. 5 is a front elevational view of the lower block with inserts.

FIG. 6 is a side elevational view of the lower block without inserts.

Similar reference characters denote corresponding features consistently throughout the attached drawings.

DETAILED DESCRIPTION OF THE PREFERRED EMBODIMENTS

The present invention provides for a guard assembly that locks on the valve knobs controlling the release of the air brakes of a tractor-trailer combination rendering control of the air brakes inoperable. Therefore, the brakes of both vehicles remain locked to prevent movement or theft of the tractor-trailer.

Figure 1:
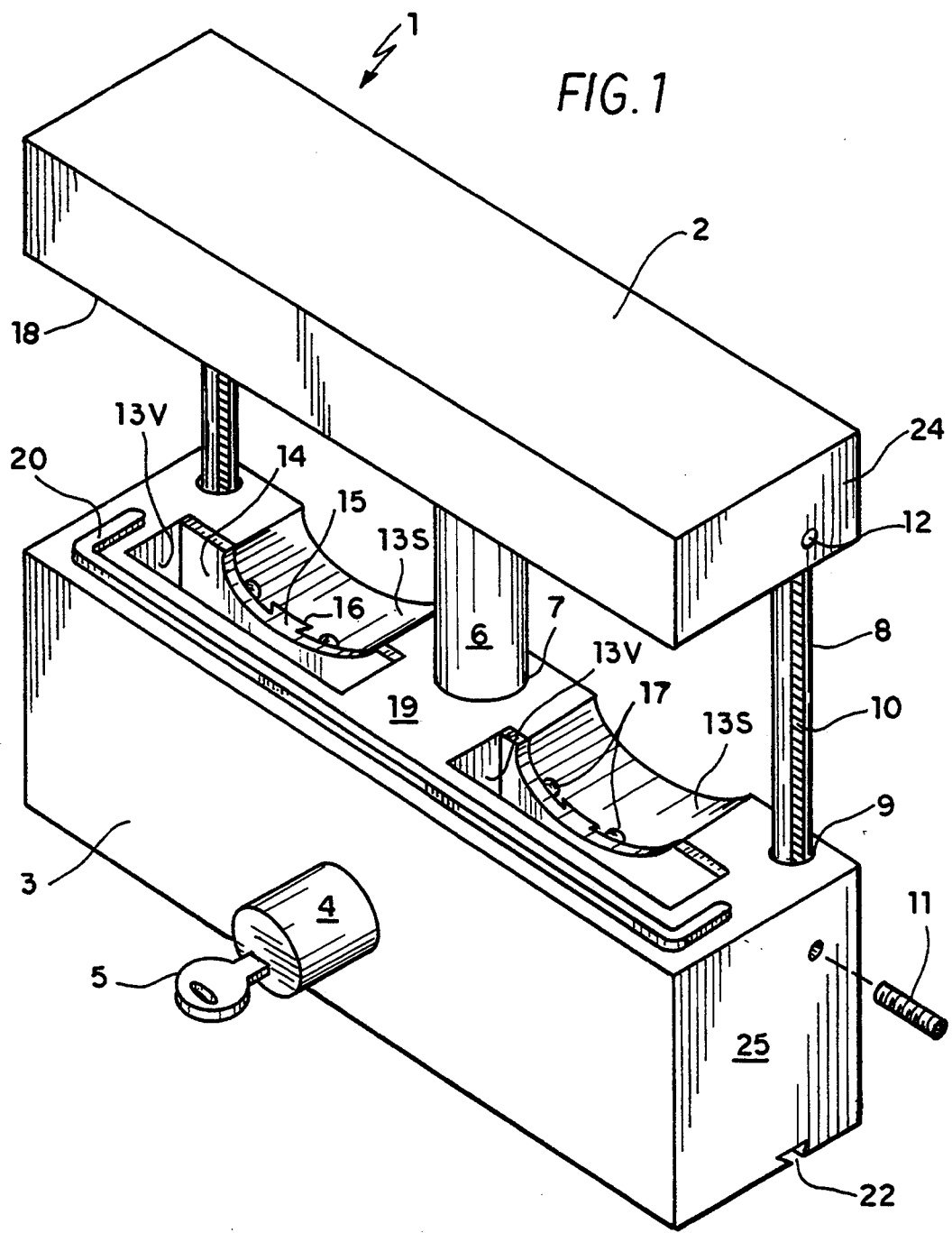
FIG. 1 is an isometric view of the guard assembly in the disengaged mode containing the removable inserts.
Figure 2:
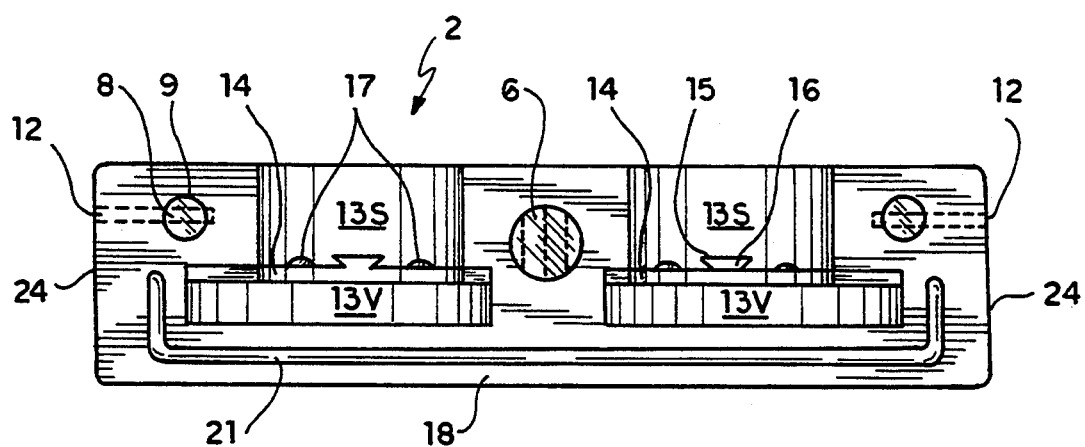
FIG. 2 is a bottom plan view of the upper block with inserts.
Figure 7:
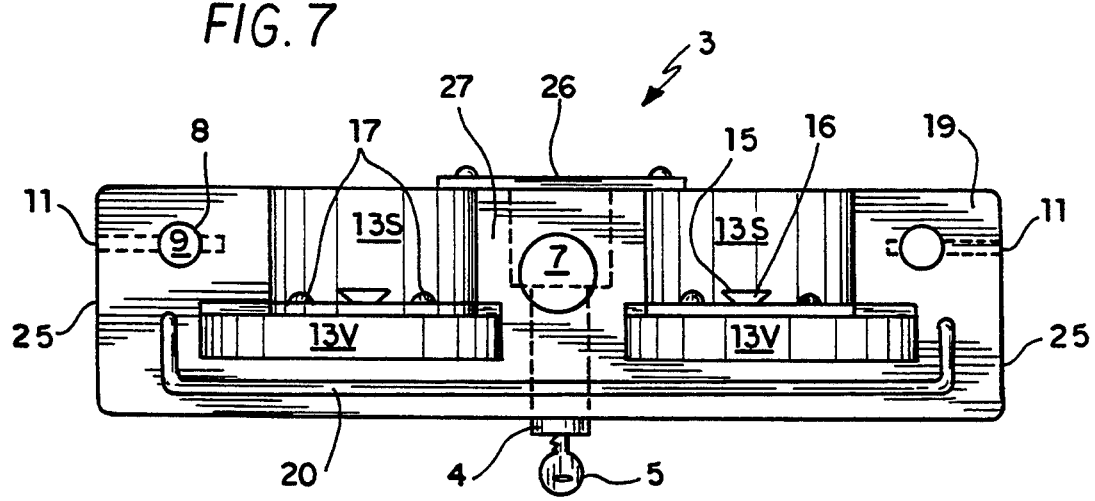
FIG. 7 is a top plan view of the lower block with inserts.

The guard device 1 in FIG. 1 comprises two halves or upper block 2 and lower block 3 consisting of an opaque, impact resistant plastic polymer composition or alternatively metal alloys. The blocks are clamped together by means of a centered thick locking post 6 (FIGS. 1-4) and at least two thinner slotted side posts 8 positioned on either side adjacent to lateral surface 24 of the upper block 2. All three posts are made of metal and molded in the upper block 2 (FIGS. 1-4). The upper body may incorporate pins 12 in the lateral surface 24 to further hold side posts 8 as seen in FIGS. 1 and 2. The side posts 8 are confined in holes 9 of the lower block 3 by pins 11 inserted from the lateral surface 25 (FIGS. 1 and 5-7) to engage slots 10 (FIGS. 1, 4, 6, and 7) of posts 8. Locking post 6 is confined to hole 7 of the lower body 3 by the locking pin 6B of lock cylinder 4 engaging the matching hole 6A in locking post 6 (FIGS. 3, 4 and 6). Matching half-wells 13S and 13V in upper block 2 and lower block 3 (FIGS. 1-7) are located in said blocks to accommodate, respectively, the valve stems (not shown) and valve knobs (not shown). The half-wells 13S contain notches 16 to accommodate the dovetail elements 15 of the four plastic or metal inserts 14 placed in half-wells 13V (FIGS. 1, 2 and 7). To facilitate the removal of inserts 14, grip holes 17 (FIGS. 1, 2 and 7) are provided in half-well 13S at the juncture with half-well 13V on either side of notch 16 in each of the four half-wells. It should be noted that inserts 14 are asymmetrical as seen in FIG. 1. These inserts may be stored under the lower block 3 in notch 22 as disclosed in FIGS. 1, 5 and 6 when not required.

The locking clamp assembly incorporates a further protective feature in that the raised ridge or tongue 20 on the top surface 19 of lower block 3 (FIGS. 1 and 5-7) engages the groove 21 on surface 18 in upper block 2 when said blocks are joined (FIGS. 2-4). Furthermore, the tongue and groove configuration is shaped like an elongated C as shown in FIGS. 1, 2 and 7.

The lock assembly includes a show-case lock. In operating this lock the key is left out and the lock cylinder protrudes in the unlocked mode as depicted in FIG. 1. Then the clamp assembly is installed over the valve handles and the blocks are joined. By pushing in the lock cylinder and tumbler 4, locking pin 6B engages hole 6A in the locking post 6 (FIG. 6). To unlock the lock device 1, the key 5 is inserted and turned to extract the tumbler's locking pin 6B and separate blocks 2 and 3 (FIG. 1). These blocks will readily separate with the addition of springs 23 in holes 9 under each side post 8 as seen in FIG. 5.

To facilitate removal of the inserts 14, retaining pins 11 must be removable from the lower block 3's lateral surface 25 and may be machine screws as depicted in FIG. 1. It may appear that removal of these screws would be deleterious to protection of the joined block assembly except that the thick center post adequately maintains the locked position of the guard assembly. Alternately, if the locking device assembly is restricted to one valve handle size, retaining pins 11 need not be removable and consist of smooth-surfaced metal pins.

If the device blocks are constructed of metal, then the lock cylinder and tumbler assembly 4 may be inserted from the rear surface 28 of lower block 3 into hole 27, with addition of metal plate 26 to prevent movement of the lock cylinder and tumbler assembly by force applied from the front (FIGS. 6 and 7).

Suitable high-impact resistant plastic compositions utilized in forming the clamp assembly are polyacrylic resins. Other desirable high-impact resistant plastic compositions are listed in the Encyclopedia of Polymer Science and Engineering, 2nd Edn., Mark et al., Eds., Vol. 8, John Wiley and Sons, N.Y., 1987, pp. 60-66, and are incorporated by reference to include plastic polymers such as high impact polystyrene (HIPS), polycarbonates, polycarbonates combined with either acrylonitrile-butadiene-styrene (ABS), polybutylene terephthalate (PBT) or poly(ethylene terephthalate) (PET), impact-modified poly(butylene terephthalate) (PBT), copolymers of PBT and PET, polyvinyl chloride (PVC), and polyethylene (PE). It is further within the scope of the invention to include suitable pigments to provide opaqueness and flame retardants in the plastic compositions, respectively, to hide the inner components and increase resistance to attack by fire.

Suitable metal alloys contemplated for forming the clamp assembly include iron, steel and aluminum.

It is understood that the present invention is not limited to the sole embodiment described above, but encompasses any and all embodiments within the scope of the following claims.

I claim:

1. A locking clamp assembly for preventing access to the valve knobs controlling the release of the air brakes of a tractor-trailer comprising:

an upper body containing a central locking post and at least two side posts extending from a bottom surface therefrom, wherein said central post has an aperture near its end and said side posts have slots therein, said body further containing half-wells between said posts adapted to confine the upper portions of the valve knobs and stems, and a lower body containing a lock cylinder and tumbler assembly, matching half-wells to the half-wells of the upper body in the top surface of said lower body, and matching holes for said side posts in said upper surface, whereby joining the upper and lower bodies permits the lock pin of the lock cylinder and tumbler assembly to engage said aperture of said central locking post.

2. The locking clamp assembly of claim 1, wherein the upper body has a grooved section situated on its bottom surface which engages a tongue section situated on the top surface of the lower body.

3. The locking clamp assembly of claim 1, wherein removable inserts are utilized in each valve knob space to accommodate a different valve knob thickness.

4. The locking clamp assembly of claim 3, wherein said removable inserts consist of an impact-resistant plastic composition.

5. The locking clamp assembly of claim 3, wherein storage is provided on the bottom surface of the lower body for storing said removable inserts.

6. The locking clamp assembly of claim 1, wherein springs are situated in the bottom of the holes for said side-posts, whereby separation of said bodies after unlocking is aided.

7. The locking clamp assembly of claim 1, wherein removable pins are provided in the lower body to engage said slots of said slotted side posts.

8. The locking clamp assembly of claim 1, wherein both bodies comprise an impact-resistant plastic composition and said central locking post and at least two side posts are molded into said upper body, and said lock cylinder and tumbler assembly is molded into said lower body.

9. The locking clamp assembly of claim 1, wherein said bodies and said posts are made of metal and the lock cylinder and tumbler assembly is inserted from the rear surface of said lower body and covered by a metal plate.

10. The locking clamp assembly of claim 1, wherein retaining pins are provided in the lateral surface of the upper body to engage said slots of said slotted side posts.

* * * * *